Patented June 10, 1930

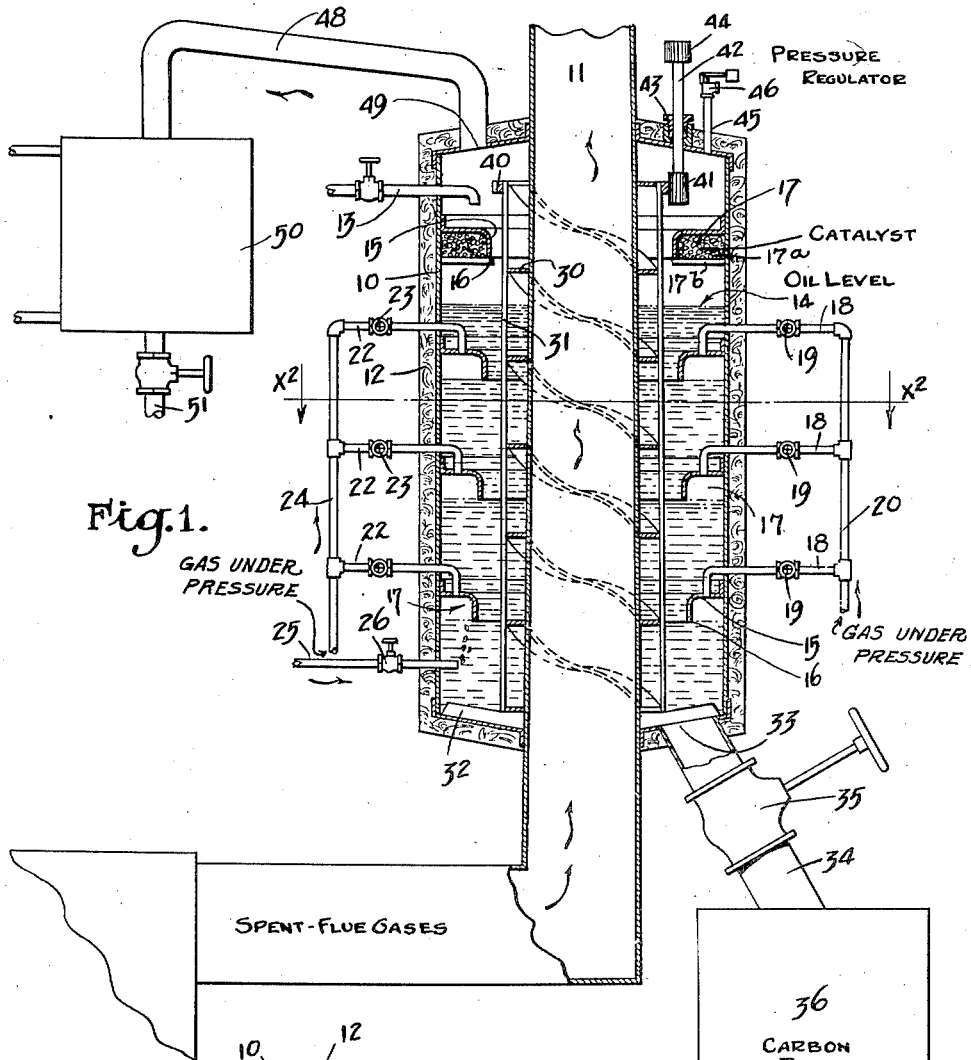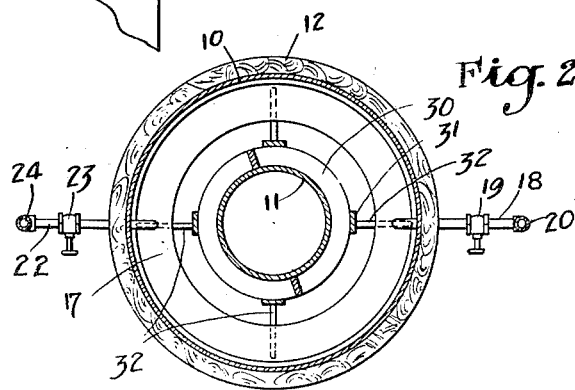

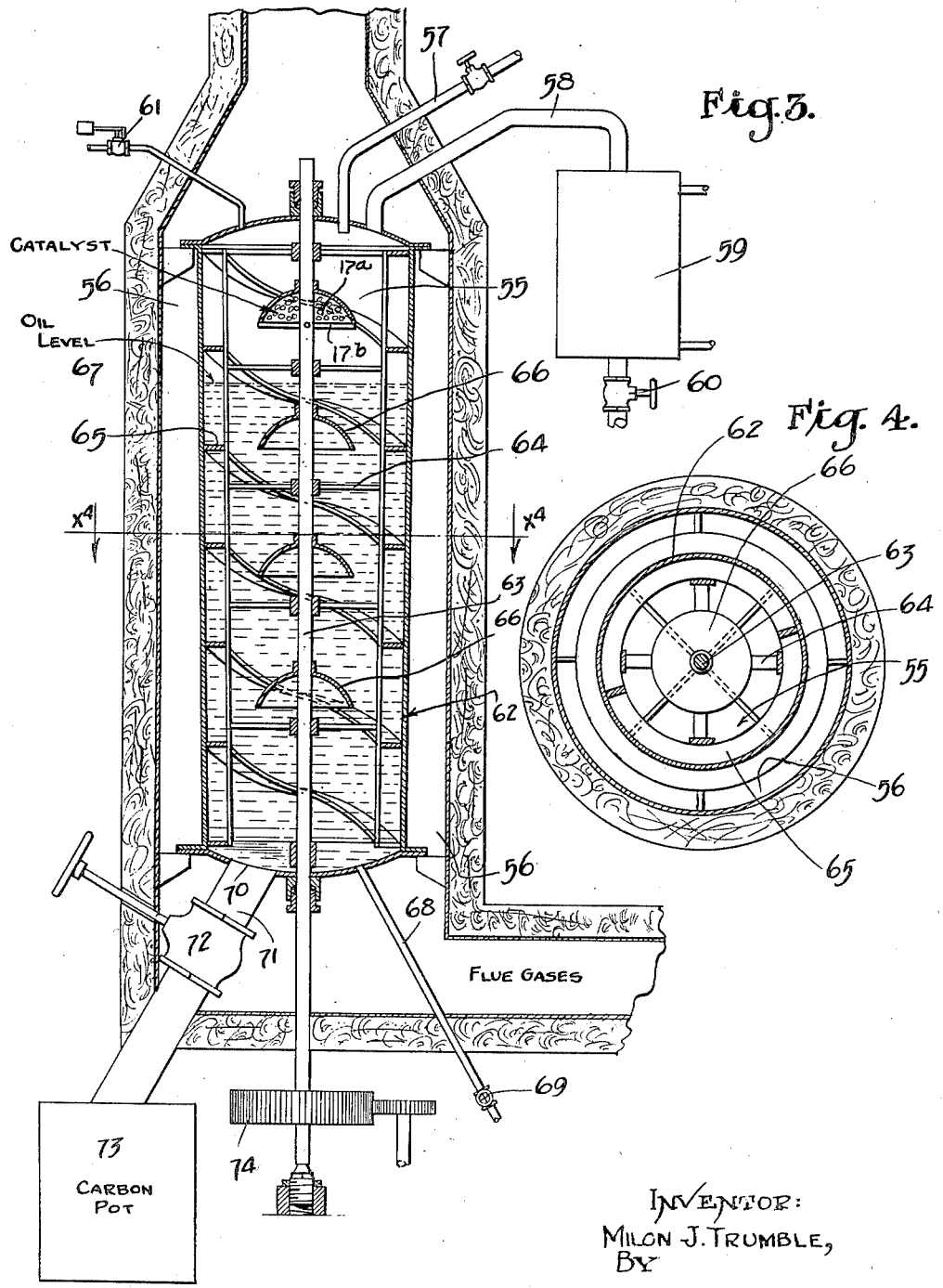

1,762,433

UNITED STATES PATENT OFFICE

MILON J. TRUMBLE, OF LOS ANGELES, CALIFORNIA

CRACKING STILL AND PROCESS

Application filed July 24, 1924. Serial No. 727,910.

My invention relates to the art of cracking hydrocarbon oils. In two-phase treating or cracking processes, such as that to which my invention relates, the oil treated is subjected simultaneously to heat and pressure sufficient to produce the desired chemical changes. The general result of such treatment may be to break up the oil into lighter products, with some incidental formation of unsaturated bodies, fixed gases and carbon residues not desired.

One of the principal objects of my invention is to provide a cracking still in which any unsaturated hydrocarbon molecules, initially present or produced by cracking, may be promptly hydrogenated; and my novel still may accordingly be provided throughout all or any desired part of its body with pockets in the form of inverted cups, or with similar means, whereby separated bodies of hydrogen or another agent, in vapor phase, may be brought and kept in intimate contact with the oil during or independently of a cracking or similar operation.

Another object of my invention is to provide a cracking still preferably conserving residual heat of flue gases with hydrogenation means effective throughout an extensive body of liquid being treated, and my preferred means for this purpose are designed to afford extensive and numerous contact surfaces between the hydrogenation agent and the liquid being treated, whereby the hydrogenation of any unsaturated molecules may take place reliably and rapidly throughout a comparatively large body of oil, or the like.

Another object of my invention is to provide carbon-removing means of simple form and construction, so arranged that the same may be readily adjusted relatively to those surfaces on which carbon tends to accumulate, the result being that such surfaces may be kept substantially free of carbon.
Other objects and advantages will appear from the following description and drawings, in which I have shown two forms of my invention, it being understood however that I do not limit my invention to the forms shown.

Referring to the drawings, which are for illustrative purposes only,

Fig. 1 is a vertical elevation of a still embodying one form of my invention.

Fig. 2 is a sectional plan view on line $X^2$—$X^2$ of Fig. 1.

Fig. 3 is a vertical sectional view of a modified form of my invention, and

Fig. 4 is a sectional plan view on line $X^4$—$X^4$ of Fig. 3. All of these views are diagrammatic.

In the form of my invention shown in Figs. 1 and 2, 10 discloses the body of a vertically arranged still which may be formed of sheet metal of sufficient strength to permit the maintenance of a considerable pressure therein. Extending vertically upwardly through this still is shown an almost cylindrical flue 11, the heat-conductive walls of such flue preferably tapering inwardly and upwardly, for purposes hereinafter described, and the lower end of the flue being connected to a furnace or other heat-producing apparatus (not shown), the spent flue gases therefrom passing upwardly from the flue after heating the still to the required temperature. This still is preferably covered with a layer of heat-insulating material 12. Oil to be treated may be introduced into the still at or near one end thereof, as through an oil supply pipe 13; and the level of such oil maintained in the still may be, for example, substantially as indicated by the dotted line 14.

Arranged in the still and mounted on the side walls thereof in any suitable manner are shown circular flanges 15, the inner end 16 of each such flange being extended downwardly to form an annular pocket or cup 17. In any or all of the pockets, and somewhat as shown in the uppermost pocket or trap 17, which is situated above the oil in the stills, a catalyst, such as a coil of platinum or nichrome wire, may be provided, for the purpose of accelerating the reaction between vapors in the still, as hereinafter more fully referred to. The catalyst $17^a$ is retained in place by any suitable means, such as the rods $17^b$ which are retained in place by any suitable means, such as welding. Those pockets or traps located in the body of oil in the still are particularly designed for the retention of hydrogen, or other gas or vapor, in the body of oil being treated. Their introduction may be effected through means such as pipes 18, controlled by valves 19, from a supply line 20, each pocket or trap 17 being provided with one or more of the pipes 18. In some instances, it may be desirable to introduce into the body of oil a gaseous agent such as heated chlorine or methane. This may be introduced into distinct or identical pockets 17, as by means of pipes 22, each shown as controlled by valves 23 and as communicating with a supply line indicated at 24. Hydrogen or steam may also be introduced directly into the body of oil, preferably near the lower portion of the still, by means such as a pipe 25, controlled by a valve 26, from any suitable supply.

My present invention may also comprise novel means for removing any carbon formed on the walls of the flue 11; and, for this purpose, I may use a helical scraper or scrapers 30 supported by any suitable open frame 31, the lower end of such scraper being shown as provided with outwardly extending plates 32, to remove any carbon or tarry residue falling to the bottom of the still to an outlet 33, which may be connected to a pipe 34, shown as controlled by a suitable valve 35, the pipe 34 delivering such carbon into a receptacle of any suitable form, as conventionally indicated at 36. The scraper 30 may be driven through the medium of a gear 40, shown as secured to the upper end of the scraper frame, said gear being shown as driven by a pinion 41, the shaft 42 of which extends through a bushing 43 in the upper wall or top of the still, and said shaft 42 being provided with rotating means such as a second pinion 44, driven from any suitable source of power.

Connected to the top of the still is shown a pipe 45, supplied with a pressure-regulating or relief valve 46 so that suitable pressure may be maintained in the still. This may be distinct from the normal vapor outlet means, which may consist of a pipe 48 communicating with an outlet opening 49 in the top of the still, this pipe 48 being preferably inclined upwardly so that such vapors as may be condensed in such pipe shall be refluxed and automatically returned to the still, the desired low-boiling vapors passing into a condenser 50, from which they may be discharged, as through a valved outlet 51, at will.

In the form shown in Figs. 3 and 4, the still indicated at 55 is vertically arranged within a stack or flue 56, oil being introduced into the still through means such as a pipe 57 and the vapors being discharged through a refluxing vapor outlet pipe 58 to a condenser 59, from which the desired condensate may be discharged at will, as through a valved outlet 60. This still is also shown as provided with a pressure-regulating valve 61, mounted in the top of the still, it being understood that the flue 56 receives heat from, for example, the flue gases from a furnace or other suitable apparatus, the still being heated, in this case, externally, through its metallic walls.

The still 55 is preferably provided with upwardly and outwardly tapered walls 62. In other words, this still may be of slightly larger diameter about the top than about the bottom, for the purpose hereinafter described. Extending vertically through the center of the still is a shaft 63, upon which is mounted, as by means of suitable arms 64, a helical scraper 65, which engages the inner walls of the still. Mounted upon the shaft 63 is a series of cups 66, a plurality of such cups being below the surface of the oil, whose level may be as indicated by the dotted line 67, and one or more of such cups being retained in the vapor space above the oil level. Such upper cup or cups, in the vapor portion of the still, are preferably used to support and protect platinum or nichrome wire for a catalytic action upon the vapor mixture contacting therewith. All of the cups are in inverted position, forming interior and substantially central pockets or traps, similar in function to those shown and described with relation to Figs. 1 and 2. In the form of still shown in Figs. 3 and 4, however, dissociated steam or hydrogen may be introduced into the body of oil in the still through a single supply line 68, controlled by a suitable valve 69, such steam or hydrogen being trapped successively in the cups 66 in intimate contact with vapors formed during the distillation operation.

Provision is also made for removing carbon from this still, which may be provided with an outlet 70 in its bottom, said outlet communicating with a pipe 71 controlled by a valve 72, this pipe 71 delivering the carbon residues through the valve to any suitable receptacle 73. The shaft 63 is driven, as by means of suitable gearing 74, from any power source, not shown.

With respect to the tapered walls of the flue 11 in the form shown in Figs. 1 and 2, and the tapered walls of the still 55, shown in Figs. 3 and 4, by this arrangement any wearing away of the scrapers may be taken up by a slight lowering of the scraper in the still. In fact the weight of the scraper will have a tendency to cause a take-up, compensating for any such wear. Especial emphasis is however placed upon the use of pockets or traps for the reception of steam or hydrogen, or other reacting agents in vapor phase, as heretofore referred to, these pockets or traps being adapted to retain gases and vapors in said pockets within oil in the still. By using a vertical or similar still and providing such pockets or traps throughout the body of the oil and optionally also thereabove, and with or without catalysts, I am enabled greatly to facilitate both a cracking and the hydrogenation of any unsaturated hydrocarbons; and I have discovered that, as a result of the application of hydrogen or steam throughout the mass of oil in the manner above described, any carbon formed may be obtained in a finely subdivided condition, instead of the heavy granular form of carbon usually formed in apparatus of the class described. This result facilitates the removal of the carbon more efficiently and economically than can be done in known stills yielding a carbon of the heavier and coherent or granular form referred to; and my use of a still having an upwardly extending body (whether vertical or inclined) is advantageous not only as permitting the use of superimposed cups or traps so arranged that a gas or vapor introduced or formed at a low point may be entrapped in an upper cup but also as assuring prolonged contact of any rising bubbles with a column of oil and as favoring the use of my adjustable scraper and my withdrawal of products and residues in the general manner described. The uppermost gas or vapor cup, in the vapor space of my still, may serve primarily as a support and a guard for the catalyzer contained therein, and the rate of feed of hydrogen, steam, or the like, to the respective cups may be adjusted to correspond with the consumption thereof, or with the special effect intended, in each of the zones of my still.

From the foregoing, it will be appreciated that both of the described embodiments of my invention involve the use of an upwardly extending still capable of operation either continuously or upon the batch principle; and it will be appreciated that stills of this general character, adapted to be used in a two-phase treatment of oils and provided with means for assuring extensive and repeated contact with a gaseous or vaporous agent introduced into pockets disposed in a series, may be employed with a wide variety of materials and in the production of numerous distinct products therefrom. When a product marketable as gasoline is to be obtained by treating a typical California oil, I may operate continuously at a temperature of about 850° F. and at a pressure of about 150 to 250 pounds, introducing hydrogen, or other gaseous agent adapted to reduce the percentage of unsaturates, at a rate sufficient to keep the cups (whether centrally or circumferentially placed) substantially full or slightly overflowing, and I may introduce oil at a rate sufficient to maintain substantially the indicated levels. The tapered helical scraper may be kept in slow continuous rotation; and any fixed gas escaping with the distillate may either be returned, or used in the maintenance of the desired temperature, or otherwise utilized in any preferred manner.

Although I have herein described alternative embodiments of my invention, it will be understood that various features thereof might be independently employed and also that various modifications might be made by those skilled in the art, without the slightest departure from the spirit and scope of my invention, as the same is indicated above and in the following claims.

I claim as my invention:

1. A two-phase oil treating apparatus comprising: an upwardly extending still body; a series of inverted gas or vapor cups secured therein; and means for heating said body by flue gases advancing through a passage separated therefrom by a heat-conductive wall, said passage being tapered and being provided with a correspondingly tapered rotary helical scraper for removing deposits from the oil-contacting surface.

2. A two-phase oil treating apparatus comprising: an upwardly extending still body; a series of inverted gas or vapor cups secured therein; means for heating said body by flue gases advancing through a passage separated therefrom by a heat-conductive wall, said passage being tapered and being provided with a correspondingly tapered rotary scraper for removing deposits from the oil-contacting surface; and means for introducing a fluid from outside said still body into said cups, one of said cups being above the level of oil in said still body and interiorly provided with a catalytic body.

3. A two-phase oil treating apparatus comprising: an upwardly extending still body; a series of inverted gas or vapor cups secured therein; means for heating said body by flue gases advancing through a passage separated therefrom by a heat-conductive wall, said passage being tapered and being provided with a correspondingly tapered rotary scraper for removing deposits from the oil-contacting surface; and a guard cup supporting a solid catalytic agent confined therein, and so secured as to be retained therein, notwithstanding the inverted disposition of said cups.

4. A two-phase oil treating apparatus embodying: a still body, traps comprising inverted cups arranged to confine a gaseous reagent at different levels in contact with and throughout the oil treated in said still body; and means for separately controlling the admission of such gaseous reagent to each of said traps.

5. A method of treating oil which comprises vaporizing the oil by heating same in a container under pressure and in contact with a gaseous reagent which is maintained in separate bodies at various elevations in the main body of oil; and continuously conducting the vapors resulting from this vaporization past a catalyst which is held entirely out of contact with oil in the liquid phase 6. A method of treating oil which comprises: vaporizing the oil by heating same in a container under pressure and in contact with a gaseous reagent which is maintained in separate bodies at various elevations in the main body of oil, continuously conducting the vapors resulting from this vaporization past a catalyst which is out of contact with oil in the liquid phase, and continuously effecting a downward removal of deposited solids.

In testimony whereof, I have hereunto set my hand at Los Angeles, California, this 17th day of July, 1924.

MILON J. TRUMBLE.